United States Patent

[11] 3,633,407

[72] Inventor Robert L. Whitman
 Oak Park, Ill.
[21] Appl. No. 11,524
[22] Filed Feb. 16, 1970
[45] Patented Jan. 11, 1972
[73] Assignee Zenith Radio Corporation
 Chicago, Ill.

[54] ACOUSTIC HOLOGRAPHY WITH A FREQUENCY-SHIFTED REFERENCE BEAM
 8 Claims, 7 Drawing Figs.
[52] U.S. Cl. .................................................... 73/67.5 H,
 340/5 H, 350/3.5
[51] Int. Cl. ....................................................... G01n 29/04
[50] Field of Search ......................................... 73/67.5 H,
 67.5, 67.6; 340/5 H; 181/0.5 NP; 350/3.5

[56] References Cited
UNITED STATES PATENTS
3,434,339 3/1969 Stetson et al. ................ 73/67.6
3,564,904 2/1971 Brenden et al. ................ 73/67.5

OTHER REFERENCES
Massey, G. A., An Optical Heterodyne Ultrasonic Image Converter, Proceedings of the IEEE, Vol. 56, No. 12, Dec. 1968, p. 2157– 2161.

Primary Examiner—Richard C. Queisser
Assistant Examiner—John P. Beauchamp
Attorney—John J. Pederson ABSTRACT: An acoustic interference pattern as manifested upon a compliant surface and caused by an impingent acoustic field carrying image information is visualized into an observable optical interference pattern which is photographed constitutes a hologram of the image information. A source beam of laser light is diffracted from the surface into a subject beam which is thereby modulated with the image information and frequency-shifted from the source light. The subject beam is separated from other diffracted light components and from background scattered noise light and directed to interfere with a reference beam at an angle such that spurious images are minimized. The reference beam is also derived from the source beam and also frequency-shifted for coherence with the subject beam, thereby forming stationary fringes representative of the acoustic interference pattern.

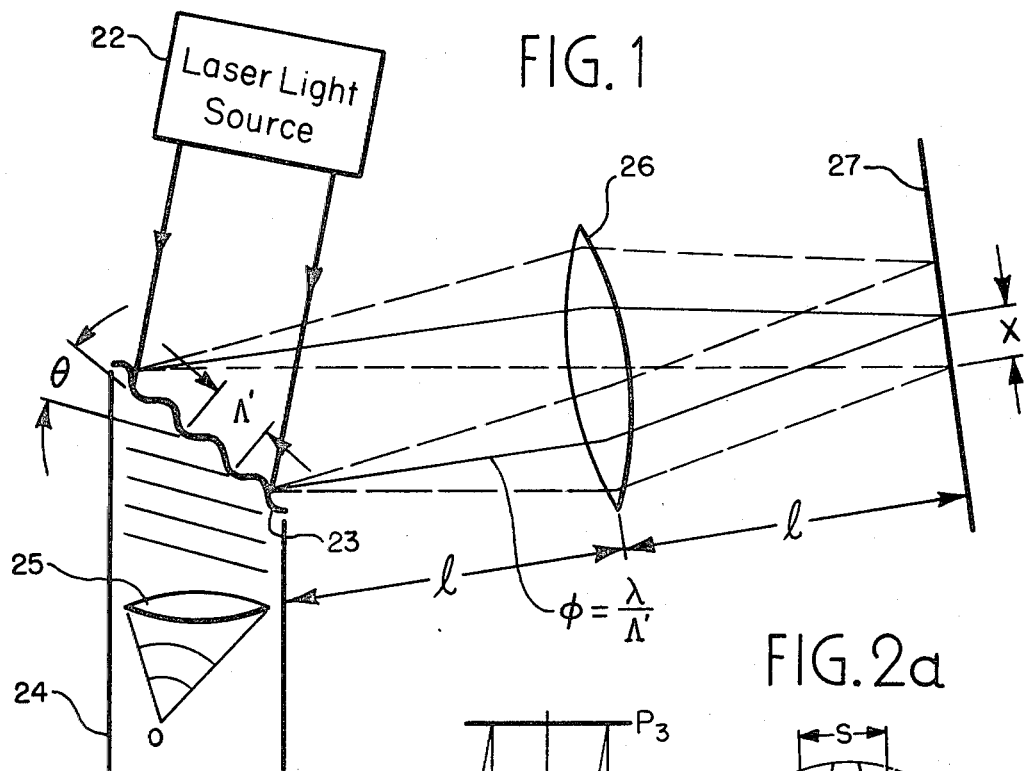
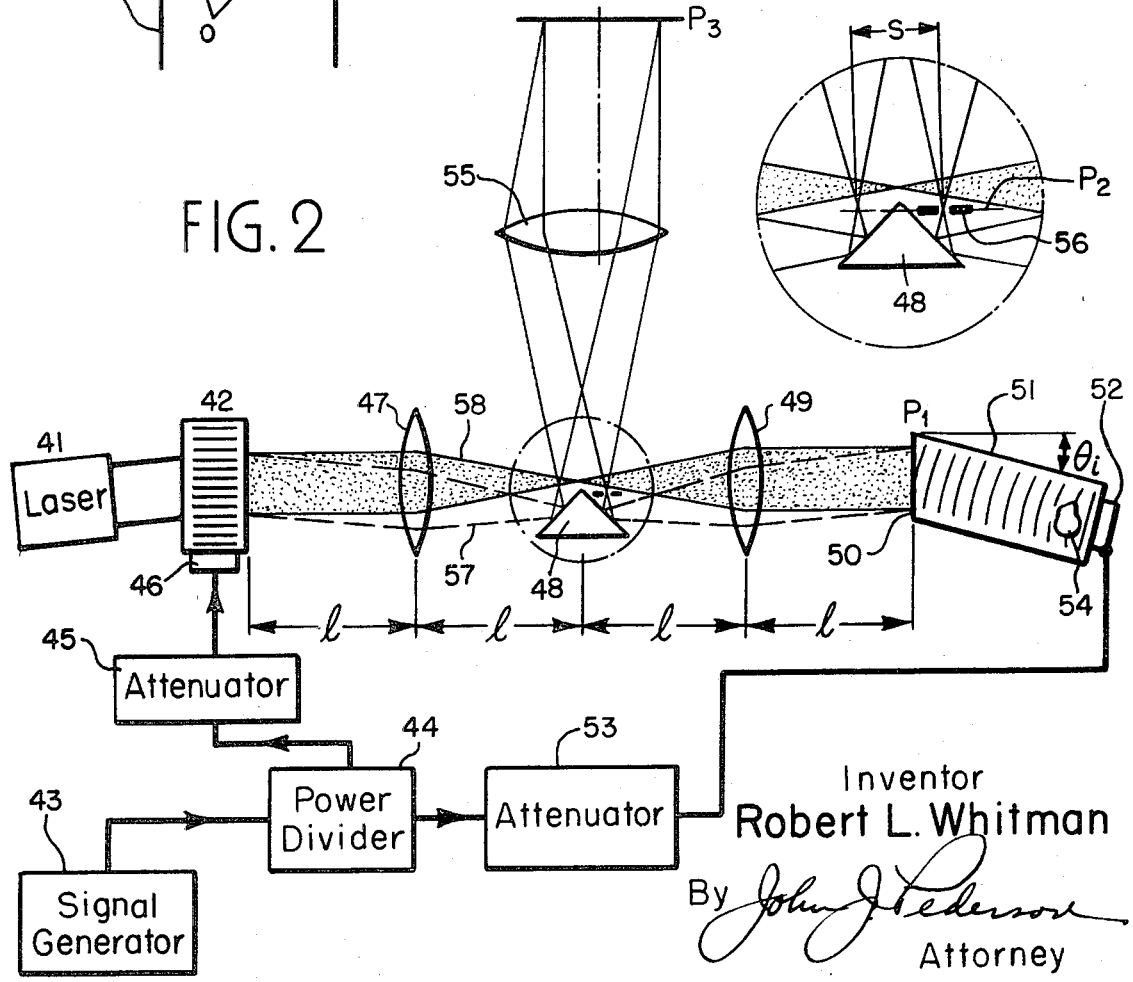

Inventor
Robert L. Whitman
By John J. Pederson
Attorney 3,633,407

ACOUSTIC HOLOGRAPHY WITH A FREQUENCY-SHIFTED REFERENCE BEAM

BACKGROUND OF THE INVENTION

This invention relates to the processing of information carried by an acoustical field. More particularly, it relates to an improved apparatus enabling the reading out of such acoustic field information in the form of an optical hologram or a directly observable interference pattern.

Applications utilizing the unique information capacity and storage capabilities of the hologram are now quite common, all of which involve the ability to obtain information as to the phase- and-amplitude distribution of a wave front at a given plane. Thus, image information which has been imparted to an optical field can be read out by forming a hologram representative of the information in the field, one interesting application being the detailing of the characteristics of an object through which wave fronts of the field have passed.

Such wave fronts may be acoustical rather than visible light, but of course must then be converted into the geometrical optical analog before any visual observations can be made. One apparatus for this purpose is that disclosed in U.S. Pat. No. 3,434,339—K. A. Stetson et al., "Holographic Method and Apparatus for Acoustical Field Recording." That device modulates light originating from a first laser source by reflecting it from a surface being driven by an information-carrying acoustical field. The resulting subject beam will have sidebands carrying the acoustic field information which result from dynamically scattered light differing in frequency from the zero order light by the value of the acoustic frequency. A reference beam from a second laser synchronized by electrical means with the first is caused to be shifted to the same frequency as one of the sidebands, and upon being caused to interfere with the subject beam will form stationary fringes, since a component of the subject beam is temporally coherent with the frequency-shifted reference beam. However, limitations in the capability of such devices for imaging the information-bearing components of the subject beam are usually encountered, inasmuch as noninformation-bearing light due to the zero order, static scattering, and undesirable interference among such components is always present in the output at a much higher intensity level than the components bearing useful information.

The present invention discloses an improved device which similarly makes use of a reference beam shifted by the acoustic field frequency, but employs a new and simplified structure and improvements in mode of operation to accomplish superior visualization of the acoustic information and greatly increased control and diminution of spurious light at the output. Only one laser source is required, greatly lessening the number and complexity of the elements required, as well as mitigating the inherent synchronization problems encountered when two coherent sources are used. The new structure enables sidebands modulated with sound field information to be separated from the much more intense but unmodulated zero-order component before being allowed to interfere with the reference beam, greatly improving contrast and mitigating the great background noise otherwise found, as well as preventing the formation of a spurious hologram with statically scattered light. Filtering and angular offsetting of beams help to remove one of the two-sideband first orders to eliminate statically scattered unmodulated light which would contribute to background-noise light.

Accordingly, an object of the invention is to produce an improved and simplified device for visualizing an acoustic field.

A second object of the invention is to provide a device for visualizing an acoustic field either through a hologram or by visual observation which improves the contrast ratio between the intensity of the desired information and that of background-noise light while eliminating spurious images.

SUMMARY OF THE INVENTION

In accordance with the invention, an apparatus for producing a hologram representative of image information borne by an acoustic field includes a source of a coherent monochromatic light beam. Interposed in the path of the source beam are means for diffracting the beam into at least a pair of output beams differing in frequency, one of which constitutes a reference beam. Interposed in the path of the other of the output beams are means for diffracting the other output beam into component beams of which one is coherent with the reference beam, and for modulating the one component beam with acoustic field information to constitute a subject beam. Also included are means for spatially filtering the subject beam to minimize spurious light in the hologram which include means for separating the subject beam from the remainder of the component beams and means for screening out angularly scattered background light about the subject beam. Means for directing the subject and reference beams to a common area on a display plane are also included, to cause the beams to interfere and to form stationary fringes which at any moment constitute an optical hologram bearing the acoustic field information.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 is a diagram illustrating the basic mechanism of image formation from light diffracted by an acoustically perturbed surface;

FIG. 2 is a schematic diagram in cross section of one embodiment of the invention;

FIG. 2a is an enlarged view of a portion of FIG. 2;

DESCRIPTION OF THE PREFERRED EMBODIMENT

Figure 3:
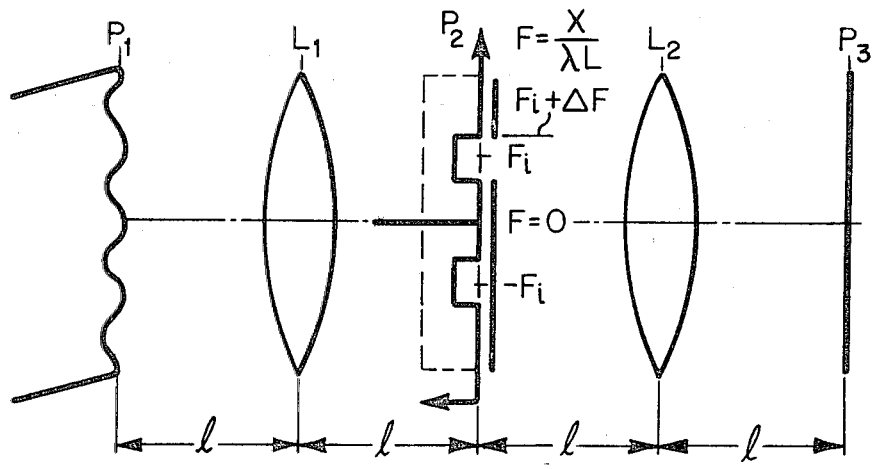
FIG. 3 is a schematic diagram illustrating the spatial filtering principle used in the invention.

In FIG. 1, an incoming coherent light beam of wavelength λ from laser light source 22 impinges upon a reflective surface 23 of compliant material. Surface 23 forms one end of a sound cell 24 in which an acoustic field is propagated, with the sound cell being driven at a constant acoustic frequency $f_s$ and which contains a point object 0 in the far field relative to the surface 23. An optical lens 26 is placed to focus light being reflected from the surface upon a screen 27 placed at the focal plane of the lens at a distance $l$.

Uniform wave fronts at acoustic frequency $f_s$ and wavelength Λ are propagated past object 0, and the resultant wave fronts eventually impinge at an angle θ upon surface 23, which forms a ripple pattern of surface displacements in response to the impinging acoustic field and proportional to the local acoustic amplitude. Point object 0 is situated either in the far sound field with relation to the surface, or closer to the surface in the focal plane of an intervening acoustic lens 25. A point object so situated results in substantially plane sound wave fronts impinging at the surface 23.

Now at any instant, this pattern of surface displacements is equivalent to an acoustic hologram formed by the acoustic wave fronts at the plane of the surface 23 interfering with an acoustic reference beam of wavelength Λ impinging normal to the plane at the acoustic wavelength $f_s$. It is this acoustic hologram which is to be reconstructed into a geometrically analogous optical hologram.

The pattern of rippled surface 23 acts as a phase grating to diffract some of the incident light from laser 22 into a number of sidebands or orders angularly displaced relative to the zero-order specularly reflected beam. With the acoustic frequency $f_a$ constant, the first order sidebands, at the angle $\pm\phi$ from the zero order, will dominate and will be Doppler-shifted to differ in frequency from the zero order, or the light incident on the surface 23, by an amount $f_a$, the acoustic frequency. Since in this case the sound wave fronts at surface 23 are essentially uniform plane waves inclined at an angle $\theta$ to the surface, the ripple pattern on the surface 23 will take the form of a sine wave of spatial wavelength $\Lambda'$, which can be defined as:

$$\Lambda' = \Lambda/\sin\theta \quad (1)$$

Then the spatial frequency can be defined as:

$$F = \pm 1/\Lambda' = \sin\theta/\Lambda \quad (2)$$

The light gathered by lens 26 and focused upon screen 27 will then be formed into a zero order resultant and two spots spaced from the zero order focus representing the first order of the diffracted light, as illustrated. Each of these two spots is an optically reconstructed image of the point object 0.

The angle $\pm\phi$ (for small angles at which the angle may be considered equal to its sine) may now be redefined in terms of spatial frequency:

$$\phi = \lambda/\Lambda' = \pm\lambda F \quad (3)$$

It is seen that the spatial frequency concept is one convenient way of specifying angular orientation of the diffracted orders with relation to the zero order.

The information-bearing first order spots are situated at a distance $X$ from the zero order focus, which for small angles is given by:

$$X = l\phi \quad (4)$$

or $$X = \pm l\lambda F = \pm l\lambda/\Lambda' \quad (5)$$

Although the above was a one-dimensional analysis for simplicity, it is understood that the additional description for a two-dimensional analysis at each relevant plane would be directly analogous, but at right angles to the axis used above.

While the apparatus of FIG. 1 illustrates the application of diffraction on which the invention depends, it is found that the information-bearing diffracted light may be obscured by background light arising from static scattering of incident light from imperfections in the smooth material of surface 23. For example, the diffracted light intensity in each order relative to the intensity of the zero order can be shown to be given by the expression:

$$I_d = \frac{1}{4}(4\pi\Delta/\lambda)^2 \quad (6)$$

where $\Delta$ is the peak surface displacement caused by the sound and $\lambda$ is a zero-order light wavelength. Even when taking $\Delta = 20$ angstroms, which is a very high displacement, and $\lambda$ to be 6,328 angstroms, the value for $I_d = 4 \times 10^{-4}$. This value is many orders smaller than that of the zero order intensity, and therefore is usually no larger in magnitude than the intensity of the light which is statically scattered from the imperfections of surface 23.

The FIG. 2 embodiment of the invention embodies the principles of the device of FIG. 1 as well as additions and improvements in a new device of much greater practicality. A conventional optical laser 41 emits a primary beam which is received by a transparent Bragg cell 42. A signal generator 43 feeds a driving signal of constant acoustic frequency through a power divider 44 and a first signal attenuator 45 to the transducer 46 of Bragg cell 42. The latter is attached to the base of cell 42 and propagates a uniform field of plane sound waves inside the cell which acts as a transmission grating to the incoming primary beam. The output surface of cell 42 is in the focal plane of a spherical lens 47, which is at a distance $l_o$ both from the cell 42 and from a reflective prism 48. A second spherical lens 49 is similarly positioned at its focal distance $l_1$ from the prism 48, with one surface 50 of a sound cell 51 also positioned at distance $l_1$ from the side of lens 49 opposite prism 48. Sound cell 51 also is equipped with a transducer 52 which propagates a uniform array of plane sound waves in the cell, being attached to a second attenuator 53 which shares in the constant-frequency output of signal generator 43. The sound cell 51 may be a liquid (e.g., water) cell provided with a receptacle for receiving an object 54 for observation and through which the sound wave fronts are propagated, to finally arrive at a smooth output surface 50 of material such as lucite or glass, forming a pattern of surface ripples or displacements thereon, as in FIG. 1. Some of the light emerging from Bragg cell 42 and lens 47 continues on through lens 49 to reach surface 50, which reflects the light back through lens 49 to prism 48.

Laser beam 41, Bragg cell 42, lenses 47 and 49, prism 48 and output surface 50 of sound cell 51 are centered about a horizontal optical axis, except that prism 48 is slightly displaced so that it intercepts only part of the converging light from lenses 47 and 49. Surface 50 is positioned so as to be orthogonal to this optical axis, while the longitudinal walls of the sound cell 51 make an angle $\theta_i$ with the axis, thus causing the sound wave fronts within the cell 51 to arrive at surface 50 at a predominant angle of incidence $90° - \theta_i$. The light intercepted by prism 48 is reflected upward along a second optical axis perpendicular to the horizontal optical axis toward an additional lens 55 situated at a focal distance $l_2$ along the second optical axis and away from the prism 48.

Before reaching lens 55, each of the projected light beams comes to a focus above prism 48. At this point it is helpful to refer to FIG. 2a, which is an enlarged view of the region about prism 48. An apertured opaque screen 56 is located in the path of the beam from lens 49 about the focal point to filter out undesirable scattered light.

In operation, a subject beam, which is to be impressed with the acoustic information present at surface 50, and a reference beam, with which to form a hologram by interference with the subject beam, are created from a single source beam from laser 41. As a source beam passes through the Bragg cell, diffraction yields a first-order beam 57 frequency-shifted to a frequency less than the zero-order frequency by the value of the acoustic frequency, which becomes the reference beam, and a zero-order beam 58 which becomes the subject beam. The lens 47 transmits both the zero-order and the first-order beams emerging from the Bragg cell, and focuses both at the focal distance $l_o$. The two focal points will be laterally displaced, since these diffracted orders as they emerge from the Bragg cell are angularly displaced form each other. The prism 48 is laterally displaced just enough with respect to the optical axis to the extent that it allows the zero-order beam 58 to pass unimpeded to lens 49 to serve as the subject beam, while the first-order beam 57 is intercepted and reflected by the prism up to lens 55 for projection to a display plane $P_3$. This projected beam is now considered the reference beam; it is frequency-shifted with respect to the zero-order beam, and will interfere with a subject beam with the same temporal frequency arriving at the same area on the display plane $P_3$ to form stationary fringes which if photographed constitute a hologram bearing the desired information.

We have now shown how both the subject and reference beams are derived from the single source beam; the path of the reference beam has also been traced through this system, and the next step will be to show how image information is imparted to the subject beam in its path to the display plane $P_3$ to interfere with the reference beam. After bypassing prism 48, the zero-order beam 58 continues form lens 47 onto lens 49, which is confocal with lens 47, to be projected normally on the focal plane $P_1$ of the lens 49, which focal plane in this case coincides with the sound cell output surface 50. This surface bears a pattern of surface displacement representative of the sound field within cell 51, of which it forms one wall. The sound cell receives for examination object 54, which may be thought of as a grouping of many object points rather than the single point found in FIG. 1, and accordingly, the acoustic waves impinging upon surface 50 within the sound cell will be of much greater complexity than in the FIG. 1 case.

It will be convenient to think of these impingent waves as resolvable into numerous plane waves inclined to the surface throughout a range of angles centered about the predominant angle of incidence $90°-\theta_i$. The previously defined $\theta_i$ which the longitudinal walls of cell 51 make with the horizontal optical axis is chosen large enough so that none of the information-bearing plane wave strikes the surface at a normal incidence, or so that all ripple spatial frequencies generated on the surface are larger than F equal zero. With the patterned surface 50 again acting as a phase grating as in FIG. 1 to diffract the incident zero-order beam principally into two first-order sidebands modulated by the information-bearing patterns, it will be shown that such a condition on $\theta_i$ is necessary to insure that the information-bearing light does not overlap with and can be separated from the nonuseful light.

The first-order sidebands are respectively Doppler-shifted to frequencies greater than and less than the zero-order frequency by the value of the acoustic frequency of the sound cell and together with a reflected zero-order component are reflected back through lens 49 toward the prism 48 which intercepts only one of the first-order components for projection up through lens 55 to the display plane $P_3$ while allowing the remaining first-order and zero-order component to pass undeflected. The beam thus projected, since it contains the light diffracted by the information-bearing perturbed surface, is the subject beam, and is superimposed on the reference beam at the display plane $P_3$ to produce the desired interference pattern of hologram thereon.

The prism just described as separating the information-bearing subject beam from other light components is one part of a unique application of the spatial filtering principle used in the invention. As is illustrated in the FIG. 2a enlarged view, the other part of the application involves the apertured opaque screen 56 placed about the subject beam at the point where the latter, after having been converged by lens 49, has been directed upward by prism 48 and finally comes to a focus. This point is on an image plane $P_2$ illustrated in FIG. 2a which is the back focal plane of lens 49.

At this juncture it is helpful to introduce FIG. 3 to illustrate and explain the spatial filter function performed in the subject beam path about the image plane $P_2$ by the apertured screen 56 and beam-separating prism 48 in a simplified schematic form. In connection with FIG. 1 it was shown that the spatial frequency F of the ripples of the perturbed surface was related to the lateral distance X from the zero-order light focus at which the first-order information-bearing light comes into focus on the image plane $P_2$, for a given $\lambda$ light wavelength and focal length $l$ of the lens. This relationship was there stated as:

$$X = F\lambda l. \quad (5)$$

Accordingly, light of a given spatial frequency will be located at a characteristic area on the imaging plane $P_2$, and the light pattern itself represents the spatial frequency spectrum of the surface perturbations. Now, because the surface ripples exhibit a range $(F_i \pm \Delta F)$ of spatial frequencies, so too will the light on the image plane which is due to diffraction from such ripples.

Then the positions of the light due to dynamic acoustic diffraction from the surface ripples on the image plane $P_2$ can be ascertained; these are the positions associated with the spatial frequencies $\pm(F_i \pm \Delta F)$, and light due to other causes will arrive at a different position. The previously stated restriction on the value of the angle $\theta_i$ helps insure that light due to other causes will arrive at another position on plane $P_2$. This has particular application with reference to the zero order, since the condition on $\theta_i$ is another way of stating that the condition.

$$|F_i \pm \Delta F| > 0 \quad (7)$$

must be satisfied; then it follows that the zero-order light at F equal zero is spatially separate from the information-bearing light at $\pm(F_i \pm \Delta F)$. This is the basis of the spatial filtering application embodied in the invention; by locating an opaque screen appropriately about the subject beam, light of all spatial frequencies is filtered out except one order of the desired diffracted light, contained in the $+(F_i \pm \Delta F)$ range, thereby greatly enhancing the information value of the subject beam.

FIG. 3 is a simplified schematic representation of the spatial filtering application in plane $P_2$. A plot of the amplitude vs. position of both scattered and dynamically diffracted light on the image plane $P_2$ as received by reflection from the diffracting surface is shown. The dotted lines represent the amplitude envelope of the statically scattered background noise light, while the large zero-order amplitude can be seen as the solid vertical line at the F equal zero orientation. The magnitude and positional range of these obscuring components contrasted to that of the envelope of the light dynamically scattered by the surface perturbations, shown as the solid lines forming boxes enclosing the quantities $\pm(F_i \pm \Delta F)$. Also shown is the schematic representation of the apertured screen serving as spatial filter which eliminates all but the desired spatial frequency range of light, by intercepting the zero order, one of the first orders and most of the background light due to statically scattered light from surface imperfections.

Adapting this representation to the FIG. 2 embodiment of the invention, the prism 48 by selecting one of the first-order beams for projection while ignoring the zero order and the other first-order beam, thereby eliminating the latter components from the light directed to plane $P_2$, does part of the same spatial filtering, while the opaque screen 56 does the remainder, in particular the elimination of any remaining background-noise light that might be traveling in the direction of the beam, but with a different angular orientation. Thus the subject beam as it travels to lens 55 and display plane $P_3$ consists only of light having the angular orientation corresponding to spatial frequencies $+(F \pm \Delta F)$, which as we have seen primarily consists of one of the first-order information-bearing sidebands, and most of the unwanted background noise light and other orders of light have been eliminated.

With the reference beam also being directed through lens 55 to display plane $P_3$ for superposition on the area illuminated by the subject beam, interference fringe patterns will be formed at the display plane. However, only those components temporally coherent with the reference beam light will form stationary fringes; the information-bearing dynamically diffracted light, having been frequency-shifted from the original light frequency by the value of the acoustic frequency, will be temporally coherent with the reference beam. The components arising from statically scattered light will form only rapidly moving interference fringes with the reference beam, since they differ from it in temporal frequency.

The FIG. 4, a graph of the light intensity at the display plane $P_3$ as a function of spatial frequency, is helpful in analyzing the resultant interference pattern. Since a time-averaged squaring of the light amplitude is implicitly involved in photographic or visual observation, this is the spatial frequency distribution which the interference pattern, or hologram, observable at the display plane $P_3$ would exhibit. The moving fringes will not be seen or observed as such, but rather appear to be steady background illumination to the observer. Accordingly, this is what is represented by much of the intensity component found at F equal zero on the plot; an additional increment is due to background light from the reference beam itself. The observation process is analogous to the mixing process between electrical harmonic signals in that the spatial difference frequencies are produced; accordingly, the fixed fringes due to interference between the reference beam at F equal zero and the coherent light component will result in spatial frequency components centered about $\pm F_i$, each $2\Delta F$ in range. Also present, but in low-spatial frequency ranges centered about F equal zero, will be noise bands due to self-interference within the subject beam itself, the solid-lined triangle showing the result of interference of dynamically diffracted light in the subject beam with itself, and the broken-lined triangle showing the result of interference of statically scattered light with itself.

Figure 4A:
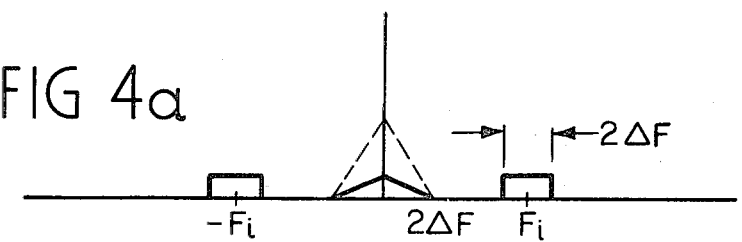
FIGS. 4a and 4b are plots of the intensity distribution of various light components in the final output interference pattern as a function of spatial frequency.

It should be noted that the action of lens 55 in gathering the subject beam diverging from plane $P_2$ to create a beam directed to display plane $P_3$ distributes all noise components as well as light of the desired information-bearing component throughout the subject beam. However, in effecting a separation of information-bearing light from noise light, the above description has great implications, especially when both have the same spatial frequency and therefore could not have been separated by screening at $P_2$. Photography or visual observation at display plane $P_3$ registers the desired informational fringes centered about spatial frequency $F_i$, and which are fixed fringes, while the component due to scattering registers only as steady background illumination and a small component of low-spatial frequency fringes centered about F equal zero which is also easily eliminated, as will be seen. Such background and noise-component illumination is considerably reduced from what would have been the case in the absence of spatial filtering of zero-order light and most of the statically scattered light and does not create a problem of obtaining sufficient contrast to easily observe the information-bearing fringes. Also, the elimination of the zero order, which is temporally coherent with the statically scattered component, prior to plane $P_2$ prevented formation of spurious stationary fringes in the spatial frequency band centered at $F_i$ at display plane $P_3$. The new central-valued noise components inevitably contained in the final interference pattern on plane $P_3$ will have an effect on the intelligibility of the interference pattern, or hologram, which is minimal compared to the previously discussed noise effects, as will later be seen. This is true especially if they are kept within a spatial frequency band which does not overlap the range of the desired information bands. Such a condition is fulfilled when the predominant spatial frequency is such that $$F_i \geq \pm 3\Delta F \quad (8)$$

as can easily be seen from FIG. 4a.

Figure 4B:
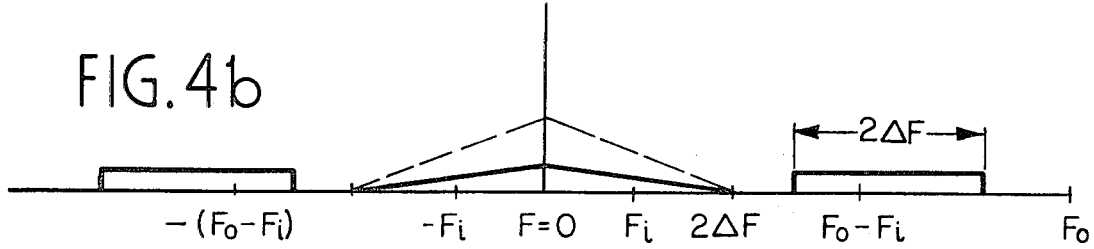

FIG. 4b illustrates the case wherein the width of the information-bearing spatial frequency band and the magnitude of its dominant spatial frequency $F_i$, are such that the above condition is not met, because of a larger range of diffraction angles and proximity of the original subject-reference beam orientations. Since the noise bands then overlap $F_i$ in spatial frequency, the reference beam is given an increased angular offset beyond that existing originally. The reference beam angular orientation now corresponds to a spatial frequency of $+(F_o)$, rather than F equals zero, which is high enough so that the desired bands, $2\Delta F$ wide and now centered on $\pm(F_o - F_i)$, are now free of overlap in spatial frequency by the central noise bands.

In the FIG. 2 embodiment of the invention, it is a function of prism 48 to control the subject beam—reference beam angular relationship at display plane $P_3$, as well as causing these beams to travel in new paths centered about the second optical axis toward display plane $P_3$. This is done by adjustment of the distance S, illustrated in the FIG. 2 insert. Where an overlap problem is not found, the distance S is adjusted to maintain the original angular relationship as found when the beams travel in paths about the first optical axis; where the presence of spatial frequency overlap requires an additional offset, the distance S is adjusted to increase the distance between beams, and therefore the angular offset between them, accordingly. The previously derived expression of equation (5) relating lateral distance between the zero order and the first order focal points on image plane $P_2$ will serve to relate the distances and spatial frequency quantitatively. Although the above was a one-dimensional analysis for simplicity, it is understood that the additional description for a two-dimensional analysis would be directly analogous.

Figure 5:
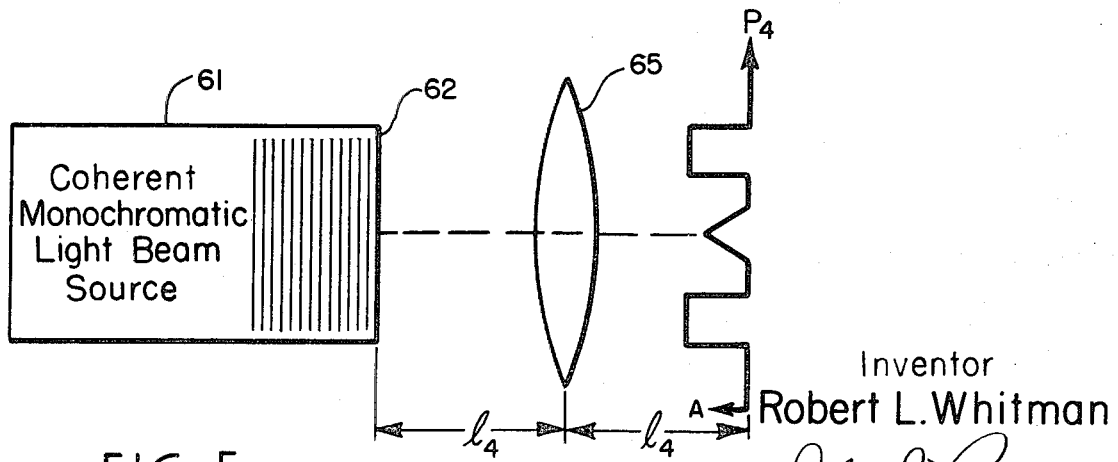
FIG. 5 is a schematic diagram of apparatus for reconstructing the image information from a hologram made with the FIG. 2 device.

It is only with the reconstruction of the image information of the original acoustic field by employing a hologram made with the FIG. 2 embodiment that all the advantages of the invention and its separation of the various components finally become apparent. In the FIG. 5 schematic of imaging from the hologram, laser beam source 61 directs a beam of monochromatic coherent light through hologram 62 (which may be a photographic film transparency of the image produced at display plane $P_3$ of FIG. 2) at an angle duplicating the reference beam angular orientation at the image plane $P_4$; thereby, a reconstructed subject beam is produced which passes through lens 65 which focuses the components of the beam upon image plane $P_4$, the focal plane of the lens. Since each of the components of the subject beam were recorded at different spatial frequencies, each will have an angular orientation and a focal position on the plane, different from the others, being governed again by the relation of equation (5). Thereby a true image of the object, as well as a conjugate image, will be formed abut image plane $P_4$ at the relative positions indicated. Similarly, the residual central spatial frequency noise bands give rise to weak spurious noise images, but because they are associated with low-spatial frequencies, they appear only at positions near the optical axis, so that the remaining noise is spatially separated from the object images. The relative amplitudes, as well as the positions of the object image component and separated noise component are illustrated by the vertical plot at image plane $P_4$. It is then a simple matter to observe a useful image substantially uncluttered by overlapping background light and spurious images with a hologram made according to the invention, since a degree of both contrast and noise separation heretofore impossible in a device of the type is obtained with the invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Apparatus for producing a hologram representative of image information borne by an acoustic field, comprising:
    a source of a coherent monochromatic light beam;
    means interposed in the path of said source beam for diffracting said beam into at least a pair of output beams differing in frequency, one of which constitutes a reference beam;
    means interposed in the path of the other of said output beams for diffracting said other output beam into component beams of which one is coherent with said reference beam, and for modulating said one component beam with acoustic field information to constitute a subject beam;
    means for spatially filtering said subject beam to minimize spurious light in the hologram, comprising means for separating the subject beam from the remainder of said component beams and means for screening out angularly scattered background light about said subject beam; and,
    means for directing said subject and reference beams to a common area on a display plane to cause the beams to interfere and to form stationary fringes which at any moment constitute an optical hologram bearing said acoustic field image information.

2. Apparatus as in claim 1, which further includes means for establishing the subject beam at an angular displacement with respect to the reference beam to minimize spurious images in the hologram.

3. Apparatus as in claim 1, in which said means for separating the subject beam from the remainder of said component beams comprises a reflective surface positioned in the path of the subject beam but out of the paths of the remainder of the component beams; and said means for screening out angularly scattered background light comprises an apertured opaque screen positioned to pass the subject beam while blocking light traveling toward the display plane at angular orientations differing from that of the subject beam.

4. Apparatus as in claim 1, in which:

said means for diffracting said source beam comprises a first light-sound interaction cell operating at a constant acoustic frequency so that said reference beam differs in frequency from said other output beam by the value of said acoustic frequency; and, said means for diffracting and modulating the other of said output beams comprises a second light-sound interaction cell operating at the same constant acoustic frequency as said first cell so that said one component beam also differs in frequency from said other component beam by the value of said acoustic frequency to achieve coherence with said reference beam.

5. Apparatus as in claim 4, in which said second light-sound interaction cell is constructed to receive specimens for acoustic irradiation, so that the subject beam modulation is representative of a characteristic of the specimen under irradiation.

6. Apparatus as in claim 4, in which said second light-sound interaction cell comprises a compliant surface disposed at an acute angle to the sound wave fronts in the cell for developing surface waves representative of said information-bearing acoustic field, and in which said compliant surface is disposed in the path of said other output beam so that said surface waves operate as a variable diffraction grating.

7. Apparatus as in claim 6, in which said compliant surface is reflective to said other output beam and is disposed transversely across its path.

8. Apparatus as in claim 4, in which said one output beam constituting said frequency-shifted reference beam is light of the first order of diffraction produced by said first light-sound interaction cell and said other output beam is light of the zero diffraction order produced by said first cell.

* * * * *